(12) United States Patent
Chu et al.

(10) Patent No.: US 9,336,104 B2
(45) Date of Patent: May 10, 2016

(54) KEYBOARD TESTING MACHINE

(71) Applicant: Quanta Computer Inc., Taoyuan Shien (TW)

(72) Inventors: Lung-Chiang Chu, Taipei (TW); Hung-Wei Wang, New Taipei (TW); Chin-Shun Lai, Taipei (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 294 days.

(21) Appl. No.: 14/070,343

(22) Filed: Nov. 1, 2013

(65) Prior Publication Data

US 2014/0283629 A1    Sep. 25, 2014

(30) Foreign Application Priority Data

Mar. 22, 2013    (TW) .............................. 102110325 A

(51) Int. Cl.
*G01M 99/00* (2011.01)
*G06F 11/22* (2006.01)

(52) U.S. Cl.
CPC ......... *G06F 11/2221* (2013.01); *G01M 99/007* (2013.01); *G01M 99/008* (2013.01)

(58) Field of Classification Search
CPC .............. G01M 99/007; G01M 99/008; G06F 11/2221; G06F 11/26; H01H 2229/018
See application file for complete search history.

(56) References Cited

U.S. PATENT DOCUMENTS

| | | | | | |
|---|---|---|---|---|---|
| 3,183,599 | A | * | 5/1965 | Byrd ....................... | H04M 1/24 324/415 |
| 3,597,981 | A | * | 8/1971 | Wakabayashi ...... | G01M 99/008 73/865.9 |
| 3,950,634 | A | * | 4/1976 | Speiser .................... | G06C 7/08 235/145 R |
| 4,034,194 | A | * | 7/1977 | Thomas .............. | G06F 11/1497 708/530 |
| 4,682,695 | A | * | 7/1987 | Hasenbalg .............. | B07C 5/344 198/346.2 |
| 5,192,152 | A | * | 3/1993 | Silvestri ................... | B41J 29/00 400/180 |
| 5,501,518 | A | * | 3/1996 | Woodward .......... | G06F 11/2221 235/145 R |
| 5,680,936 | A | * | 10/1997 | Beers ................. | H05K 13/0061 198/346.2 |

(Continued)

FOREIGN PATENT DOCUMENTS

| CN | 201788120 U | 4/2011 |
|---|---|---|
| CN | 202067257 U * | 12/2011 |

(Continued)

*Primary Examiner* — David A Rogers
(74) *Attorney, Agent, or Firm* — Sawyer Law Group, P.C.

(57) ABSTRACT

A keyboard testing machine for testing a keyboard of an electronic apparatus is provided. The keyboard testing machine includes a rack, a fixing base, and a pressing module. The fixing base is operatively connected to the rack and located over the electronic apparatus. The pressing module is located over the keyboard and includes a drive shaft, a rotating member, and a pressing assembly. The drive shaft is rotatably disposed on the fixing base. The rotating member is sleeved onto the drive shaft and has a cam portion. The pressing assembly is operatively connected to the fixing base and the cam portion. When the drive shaft rotates together with the rotating member, the cam portion drives the pressing assembly to linearly move relative to the fixing base, so as to make the pressing assembly cyclically press the keyboard.

10 Claims, 4 Drawing Sheets

(56) References Cited

U.S. PATENT DOCUMENTS

| | | | | | |
|---|---|---|---|---|---|
| 5,827,983 | A | * | 10/1998 | Ortoli | G06F 11/26 714/E11.159 |
| 6,304,830 | B1 | * | 10/2001 | Lee | G01M 99/008 340/301 |
| 6,314,825 | B1 | * | 11/2001 | Fan | G01M 99/008 73/865.3 |
| 6,581,483 | B1 | * | 6/2003 | Yeh | G01M 99/007 73/865.3 |
| 6,648,531 | B1 | * | 11/2003 | Goldberg | G06F 3/0202 400/473 |
| 8,099,253 | B1 | * | 1/2012 | Rau | G01M 99/008 400/473 |
| 2008/0184825 | A1 | * | 8/2008 | Li | G01M 99/008 73/865.9 |
| 2008/0257058 | A1 | * | 10/2008 | Chiu | G01M 99/007 73/818 |
| 2011/0251818 | A1 | * | 10/2011 | Pei-Ming | G06F 11/2221 702/120 |
| 2012/0136607 | A1 | * | 5/2012 | Chang | G06F 11/2221 702/108 |
| 2012/0192009 | A1 | * | 7/2012 | Chang | G06F 11/2221 714/27 |
| 2012/0198948 | A1 | * | 8/2012 | Huang | G01M 99/008 73/865.3 |
| 2013/0152711 | A1 | * | 6/2013 | Xu | G06F 11/2221 73/865.9 |

FOREIGN PATENT DOCUMENTS

| | | | | |
|---|---|---|---|---|
| JP | 61100824 | A | * | 5/1986 |
| JP | 01108623 | A | * | 4/1989 |
| JP | 04278621 | A | * | 10/1992 |
| JP | 05257584 | A | * | 10/1993 |
| JP | 05324154 | A | * | 12/1993 |
| JP | 05333985 | A | * | 12/1993 |
| JP | 08278843 | A | * | 10/1996 |
| JP | 09146673 | A | * | 6/1997 |
| SU | 1158381 | A1 | * | 5/1985 |
| TW | 407735 | | | 10/2000 |
| TW | M368832 | | | 11/2009 |

\* cited by examiner

KEYBOARD TESTING MACHINE

CROSS-REFERENCE TO RELATED APPLICATIONS

This application claims priority to Taiwan Application Serial Number 102110325, filed Mar. 22, 2013, which is herein incorporated by reference.

FIELD OF THE INVENTION

The present disclosure relates to a keyboard testing machine, and more particularly, to a keyboard testing machine for testing keyboards of notebook computers.

BACKGROUND

In the present information-oriented society, keyboards almost are indispensable input devices for electronic apparatuses, such as personal computers, notebook computers, calculators, telephones, etc. Therefore, whether or not a keyboard correctly functions affects signals thereby inputted into an electronic apparatus, so it is necessary to completely test that the functions of the keyboard work perfectly.

Currently in the industry, keyboards are tested by a manually or a machinery testing approach. The manually testing approach is to press keyswitches of keyboards one by one by a large number of workers. However, in the manually testing approach there exists shortages of: (1) requiring operators to interact with testing software; (2) taking long test time at low efficiency; (3) requiring repeatedly testing for the operators may incorrectly press the respective keyswitches; and (4) occurring slowdowns of the operators.

Accordingly, it is an important issue of providing a keyboard testing machine to automatically test keyboards of electronic apparatuses, so as to improve testing accuracy and efficiency.

SUMMARY

The disclosure provides a keyboard testing machine for testing a keyboard of an electronic apparatus. The electronic apparatus is carried on a conveyer. The keyboard testing machine includes a rack, a fixing base, and a pressing module. The rack is adjacent to the conveyer. The fixing base is operatively connected to the rack and located over the conveyer. The pressing module is located over the keyboard and includes a drive shaft, a rotating member, and a pressing assembly. The drive shaft is rotatably disposed on the fixing base. The rotating member is sleeved onto the drive shaft and has a cam portion. The pressing assembly is operatively connected to the fixing base and the cam portion. When the drive shaft rotates together with the rotating member, the cam portion drives the pressing assembly to linearly move relative to the fixing base, so as to make the pressing assembly cyclically press the keyboard.

In an embodiment of the disclosure, the rack has a first track. The first track is located over the conveyer. The keyboard testing machine further includes a first sliding base. The first sliding base is operatively connected to the fixing base and is slidably disposed on the first track, so as to drive the fixing base to move relative to the first track.

In an embodiment of the disclosure, the keyboard testing machine further includes a horizontally moving module. The horizontally moving module is operatively connected to the rack and the fixing base, so as to drive the fixing base to horizontally move relative to the first track by the first sliding base.

In an embodiment of the disclosure, the rack further has a second track. The second track is parallel to the first track. The horizontally moving module includes a first screw, a second sliding base, a first belt, and a first driver. The first screw is rotatably disposed on the rack and parallel to the first track. The second sliding base is rotatably sleeved onto the first screw and slidably engaged with the second track. The first belt is sleeved onto the first screw. The first driver is fixed to the fixing base and the second sliding base, so as to drive the first screw to rotate by the first belt. The rotated first screw drives the second sliding base to slide relative to the second track, and drives the first sliding base to slide relative to the first track through the first driver and the fixing base.

In an embodiment of the disclosure, the keyboard testing machine further includes a reader and a processor. The reader is adjacent to the conveyer and is used to read a barcode on the electronic apparatus. The processor is electrically connected to the reader and the first driver, and is used to drive the first driver according to the barcode.

In an embodiment of the disclosure, the keyboard testing machine further includes a vertically moving module. The vertically moving module is disposed on the first sliding base and connected to the fixing base, so as to drive the fixing base to vertically move relative to the first sliding base.

In an embodiment of the disclosure, the vertically moving module includes a second screw, a third sliding base, a lifting board, a first rod, a second belt, and a second driver. The second screw is rotatably disposed on the first sliding base and parallel to the sliding base. The third sliding base is rotatably sleeved onto the second screw and slidably engaged with the first sliding base. The lifting board has an inclined plane for the third sliding base to abut against. The first rod vertically passes through the first sliding base, and two ends of the first rod are respectively connected to the lifting board and the fixing base. The second belt is sleeved onto the second screw. The second driver is disposed on the first sliding base, so as to drive the second screw to rotate by the second belt. The rotated second screw drives the third sliding base to move relative to the first sliding base to push the inclined plane, so as to drive the fixing base to vertically move relative to the first sliding base through the lifting board and the first rod.

In an embodiment of the disclosure, the keyboard testing machine further includes a reader and a processor. The reader is adjacent to the conveyer and is used to read a barcode on the electronic apparatus. The processor is electrically connected to the reader and the second driver, and is used to drive the second driver according to the barcode.

In an embodiment of the disclosure, the fixing base includes a supporting bracket. The cam portion has a circular groove located at the outer edge of the cam portion. The pressing assembly includes an engaging member, a first guiding block, a second rod, a second guiding block, a third rod, a stopper, a pressing block, and a spring. The engaging member is slidably engaged with the circular groove. The first guiding block is fixed to the supporting bracket. The second rod passes through the first guiding block, and an end of the second rod is connected to the engaging member. The second guiding block is connected to another end of the second rod. The third rod passes through the second guiding block. The stopper is located between the first guiding block and the second guiding block and connected to an end of the third rod. The pressing block is connected to another end of the third rod, so as to press the keyboard. The spring is sleeved onto the third rod and compressed between the second guiding block and the pressing block. In an embodiment of the disclosure, the pressing block includes a rubber wheel for pressing the keyboard.

In an embodiment of the disclosure, the pressing module further includes a third driver for driving the drive shaft to rotate. The keyboard testing machine further includes a first light sensor and a processor. The first light sensor is adjacent to the conveyer and is used to generate a first blocking signal when the electronic apparatus passes by. The processor electrically is connected to the first light sensor and is used to turn on the third driver according to the first blocking signal.

In an embodiment of the disclosure, the keyboard testing machine further includes a second light sensor. The second light sensor is adjacent to the conveyer and electrically connected to the processor, and is used to generate a second blocking signal when the electronic apparatus passes by. The first light sensor and the second light sensor are sequentially placed along a conveying direction of the conveyer. The processor turns off the third driver according to the second blocking signal.

Accordingly, the pressing module included in the keyboard testing machine of the disclosure drives the pressing assembly to cyclically press the keyboard of the electronic apparatus, so as to save manpower. The keyboard testing machine of the disclosure is able to move the pressing module by using the horizontally moving module and the vertically moving module, and is able to use the reader to read the barcode on the electronic apparatus and thus recognize the type of the electronic apparatus, so as to accurately adjust the horizontal position and the vertical position of the pressing module relative to the keyboard by controlling the horizontally moving module and the vertically moving module according to the type of the electronic apparatus. Furthermore, the keyboard testing machine has light sensors to detect whether the electronic apparatus on the conveyer passes by, so as to start or stop the pressing module when the electronic apparatus passes by the light sensors and thus save energy.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
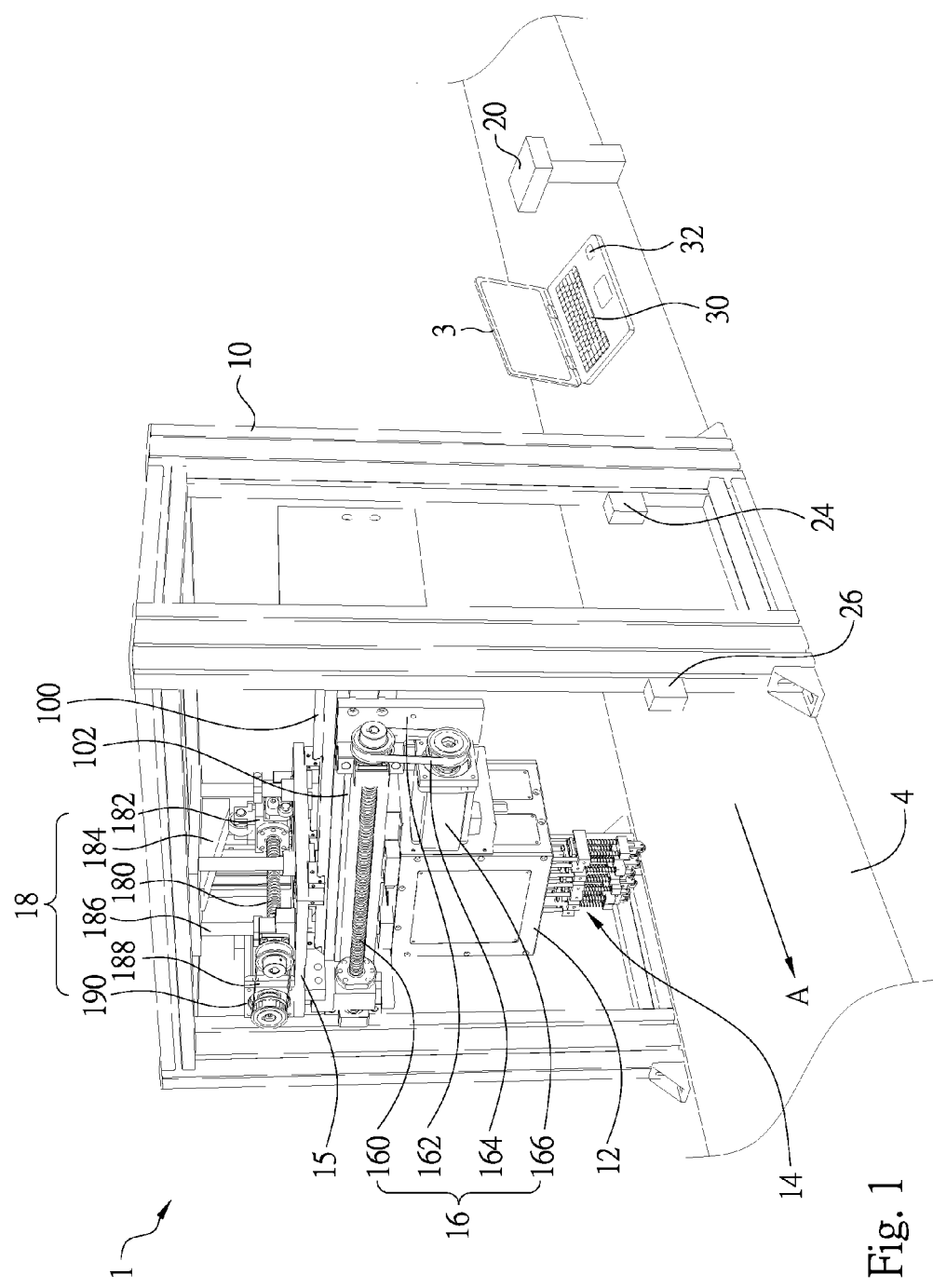
FIG. 1 is a perspective view of a keyboard testing machine according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
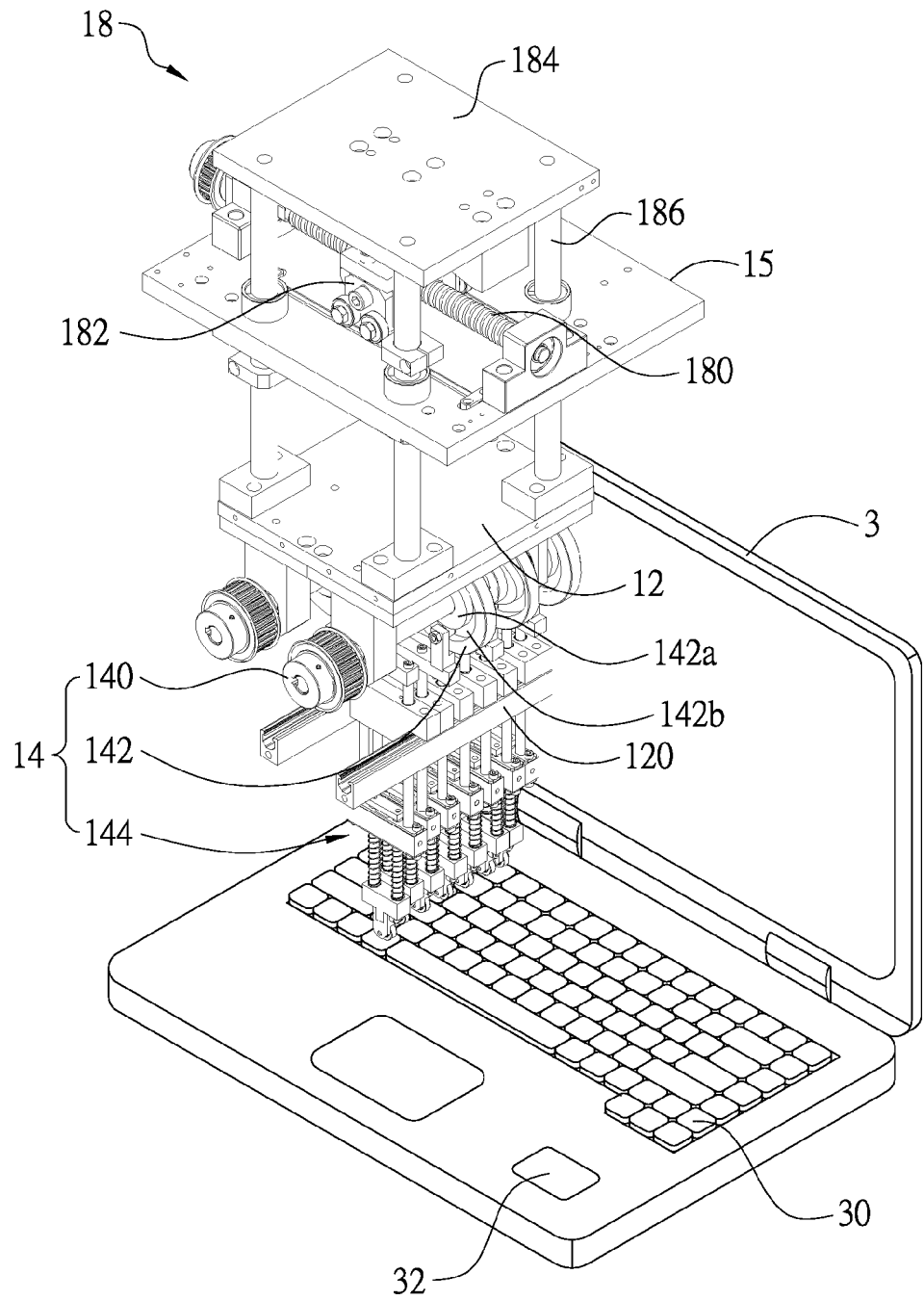
FIG. 2 is a partial perspective view of the keyboard testing machine in FIG. 1.

FIG. 1 is a perspective view of a keyboard testing machine 1 according to an embodiment of the disclosure. FIG. 2 is a partial perspective view of the keyboard testing machine 1 in FIG. 1.

As shown in FIG. 1 and FIG. 2, the keyboard testing machine 1 is used to test a keyboard 30 of an electronic apparatus 3. The electronic apparatus 3 is carried on a conveyer 4. In the embodiment of the disclosure, the electronic apparatus 3 is a notebook computer, but the disclosure is not limited in this regard. As long as an electronic apparatus has a keyboard (or just an individual keyboard), the keyboard testing machine 1 can be used to test.

The keyboard testing machine 1 includes a rack 10, a fixing base 12, and a pressing module 14. The rack 10 of the keyboard testing machine 1 is adjacent to and across over the conveyer 4. The fixing base 12 of the keyboard testing machine 1 is operatively connected to the rack 10 and located over the conveyer 4. The pressing module 14 of the keyboard testing machine 1 is located over the keyboard 30 and includes a drive shaft 140, a rotating member 142, and a pressing assembly 144. The drive shaft 140 of the pressing module 14 is rotatably disposed on the fixing base 12. The rotating member 142 of the pressing module 14 is sleeved onto the drive shaft 140 and has a cam portion 142a. The pressing assembly 144 of the pressing module 14 is operatively connected to the fixing base 12 and the cam portion 142a. When the drive shaft 140 of the pressing module 14 rotates together with the rotating member 144, the cam portion 142a of the rotating member 142 drives the pressing assembly 144 to linearly move relative to the fixing base 12, so as to make the pressing assembly 144 cyclically press the keyboard 30 of the electronic apparatus 3.

Figure 3:
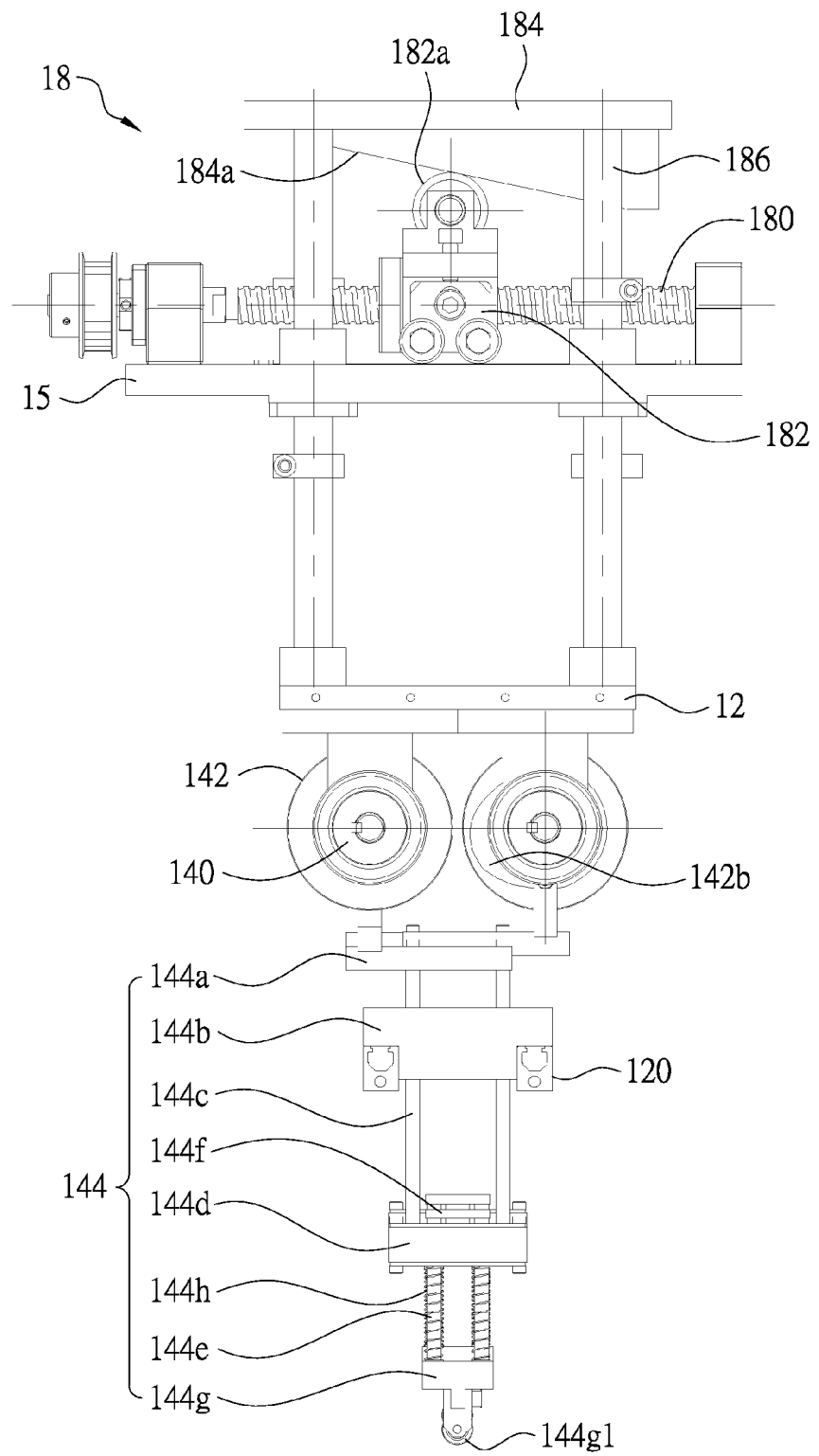
FIG. 3 is a partial front view of the keyboard testing machine in FIG. 2.

FIG. 3 is a partial front view of the keyboard testing machine 1 in FIG. 2.

As shown in FIG. 2 and FIG. 3, the fixing base 12 of the keyboard testing machine 1 includes a supporting bracket 120. The supporting bracket 120 of the fixing base 12 is horizontally located over the conveyer 4. The cam portion 142a of the rotating member 142 has a circular groove 142b located at the outer edge of the cam portion 142a. The pressing assembly 144 of the pressing module 14 includes an engaging member 144a, a first guiding block 144b, second rods 144c, a second guiding block 144d, third rods 144e, a stopper 144f, a pressing block 144g, and springs 144h.

The engaging member 144a of the pressing assembly 144 is slidably engaged with the circular groove 142b of the cam portion 142a. The first guiding block 144b of the pressing assembly 144 is fixed to the supporting bracket 120 of the fixing base 12. The second rods 144c of the pressing assembly 144 pass through the first guiding block 144b, and two ends of each of the second rods 144c are respectively connected to the engaging member 144a and the second guiding block 144d. The third rods 144e of the pressing assembly 144 pass through the second guiding block 144d. The stopper 144f of the pressing assembly 144 is located between the first guiding block 144b and the second guiding block 144d, and is connected to an end of each of the third rods 144e. The pressing block 144g is connected to another end of each of the third rods 144e, so as to press the keyboard 30. The second guiding block 144d of the pressing assembly 144 is used to guide the third rods 144e to slide linearly. The springs 144h of the pressing assembly 144 are sleeved onto the third rods 144e respectively and compressed between the second guiding block 144d and the pressing block 144g.

The engaging member 144a, the second rods 144c, and the second guiding block 144e are fixed to each other, and the second rods 144c are guided by the second guiding block 144d, so the engaging member 144a, the second rods 144c, and the second guiding block 144e are driven to cyclically move relative to the first guiding block 144b when the rotating member 142 of the pressing module 14 rotates.

Furthermore, the stopper 144f, the third rods 144e, and the pressing block 144g of the pressing assembly 144 are fixed to each other, and the third rods 144e are guided by the second guiding block 144d, so the stopper 144f, the third rods 144e, and the pressing block 144g of the pressing assembly 144 cyclically move with the engaging member 144a, the second rods 144c, and the second guiding block 144e relative to the first guiding block 144b when the rotating member 142 of the pressing module 14 rotates and the pressing block 144g does not press the keyboard 30 of the electronic apparatus 3.

However, during the period that the rotating member 142 of the pressing module 14 rotates and the pressing block 144g presses the keyboard 30 of the electronic apparatus 3, the stopper 144f, the third rods 144e, and the pressing block 144g linearly move along the direction of leaving the keyboard 30 relative to the second guiding block 144d, and the springs 144h that are compressed between the second guiding block 144d and the pressing block 144g can achieve the effects of cushioning the pressing force of the pressing module 14 and the reaction force of the keyboard 30.

In order to further cushion the impact between the pressing module 14 and the keyboard 30 of the electronic apparatus 3, in the embodiment of the disclosure, the pressing block 144g of the pressing assembly 144 includes a rubber wheel 144g1 of which the value of Shore hardness is about 60 degrees, so as to press the keyboard 30, but the disclosure is not limited in this regard.

In the embodiment of the disclosure, the number of the second rods 144c and the number of the third rods 144e of the pressing assembly 144 are both two, but the disclosure is not limited in this regard and can be adjusted as needed.

As shown in FIG. 1, the rack 10 of the keyboard testing machine 1 has a first track 100. The first track 100 of the rack 10 is located over the conveyer 4. The keyboard testing machine 1 further includes a first sliding base 15. The first sliding base 15 of the keyboard testing machine 1 is operatively connected to the fixing base 12 and is slidably disposed on the first track 100 of the rack 10, so as to drive the fixing base 12 to move relative to the first track 100. The keyboard testing machine 1 further includes a horizontally moving module 16. The horizontally moving module 16 of the keyboard testing machine 1 is operatively connected to the rack 10 and the fixing base 12, so as to drive the fixing base 12 to horizontally move relative to the first track 100 by the first sliding base 15.

Furthermore, the rack 10 of the keyboard testing machine 1 further has a second track 102. The second track 102 of the rack 10 is parallel to the first track 100. The horizontally moving module 16 of the keyboard testing machine 1 includes a first screw 160, a second sliding base 162, a first belt 164, and a first driver 166. The first screw 160 of the horizontally moving module 16 is rotatably disposed on the rack 10 and parallel to the first track 100 and the second track 102. The second sliding base 162 of the horizontally moving module 16 is rotatably sleeved onto the first screw 160, engaged with the screw thread of the first screw 160, and slidably engaged with the second track 102. The first belt 164 of the horizontally moving module 16 is sleeved onto the first screw 160. The first driver 166 of the horizontally moving module 16 is fixed to the fixing base 12 and the second sliding base 162, so as to drive the first screw 160 to rotate by the first belt 164.

Hence, when the first driver 166 of the horizontally moving module 16 drives the first screw 160 to rotate by the first belt 164, the rotated first screw 160 drives the second sliding base 162 to slide relative to the second track 102.

The second sliding base 162 and the first driver 166 of the horizontally moving module 16 and the fixing base 12 are fixed to each other, and the fixing base 12 is operatively connected to the sliding base 15, so the second sliding base 162 that slides relative to the second track 102 indirectly drives the first sliding base 15 to slide relative to the first track 100. Therefore, the keyboard testing machine 1 is capable of adjusting the horizontal position of the pressing module 14 that is disposed on the fixing base 12 relative to the keyboard 30 by the horizontally moving module 16.

However, the horizontally moving module 16 of the disclosure is not limited in this regard. In another embodiment of the disclosure, the horizontally moving module 16 of the keyboard testing machine 1 is a linear guideway disposed on the second track 102.

As shown in FIG. 1, FIG. 2, and FIG. 3, the keyboard testing machine 1 further includes a vertically moving module 18. The vertically moving module 18 of the keyboard testing machine 1 is disposed on the first sliding base 15 and connected to the fixing base 12, so as to drive the fixing base 12 to vertically move relative to the first sliding base 15.

Furthermore, the vertically moving module 18 of the keyboard testing machine 1 includes a second screw 180, a third sliding base 182, a lifting board 184, first rods 186, a second belt 188, and a second driver 190. The second screw 180 of the vertically moving module 18 is rotatably disposed on the first sliding base 15 and parallel to the sliding base 15. The third sliding base 182 of the vertically moving module 18 is rotatably sleeved onto the second screw 180, engaged with the screw thread of the second screw 180, and slidably engaged with the first sliding base 15. The lifting board 184 of the vertically moving module 18 has an inclined plane 184a for the third sliding base 182 to abut against. The third sliding base 182 of the vertically moving module 18 has a roller 182a, so as to smoothly slide relative to the inclined plane 184a of the lifting board 184. The inclined plane 184a of the lifting board 184 is inclined relative to the second screw 180. The first rods 186 vertically pass through the first sliding base 15, and two ends of each of the first rods 186 are respectively connected to the lifting board 184 and the fixing base 12. The second belt 188 of the vertically moving module 18 is sleeved onto the second screw 180. The second driver 190 of the vertically moving module 18 is disposed on the first sliding base 15, so as to drive the second screw 180 to rotate by the second belt 188.

Hence, when the second driver 190 of the vertically moving module 18 drives the second screw 180 to rotate by the second belt 188, the rotated second screw 180 drives the third sliding base 182 to move relative to the first sliding base 150 to push the inclined plane 184a, so as to move the lifting board 184 vertically up or down relative to the first sliding base 15 (i.e., the horizontal movement of the third sliding base 182 relative to the first sliding base 15 is transferred to the vertical movement of the lifting board 184 relative to the first sliding base 15).

The lifting board 184 and the first rods 186 of the vertically moving module 18 and the fixing base 12 are fixed to each other, so when the lifting board 184 is moved up or down by the roller 182a of the third sliding base 182, the fixing base 12 is driven to vertically move relative to the first sliding base 15. Therefore, the keyboard testing machine 1 is capable of adjusting the vertical position of the pressing module 14 that is disposed on the fixing base 12 relative to the keyboard 30 by the vertically moving module 18.

However, the vertically moving module 18 of the disclosure is not limited in this regard. In another embodiment of the disclosure, the vertically moving module 18 of the keyboard testing machine 1 is a linear guideway disposed on the rack 10.

In the embodiment of the disclosure, the number of the first rods 144c of the vertically moving module 18 is four, but the disclosure is not limited in this regard and can be adjusted as needed.

Figure 4:
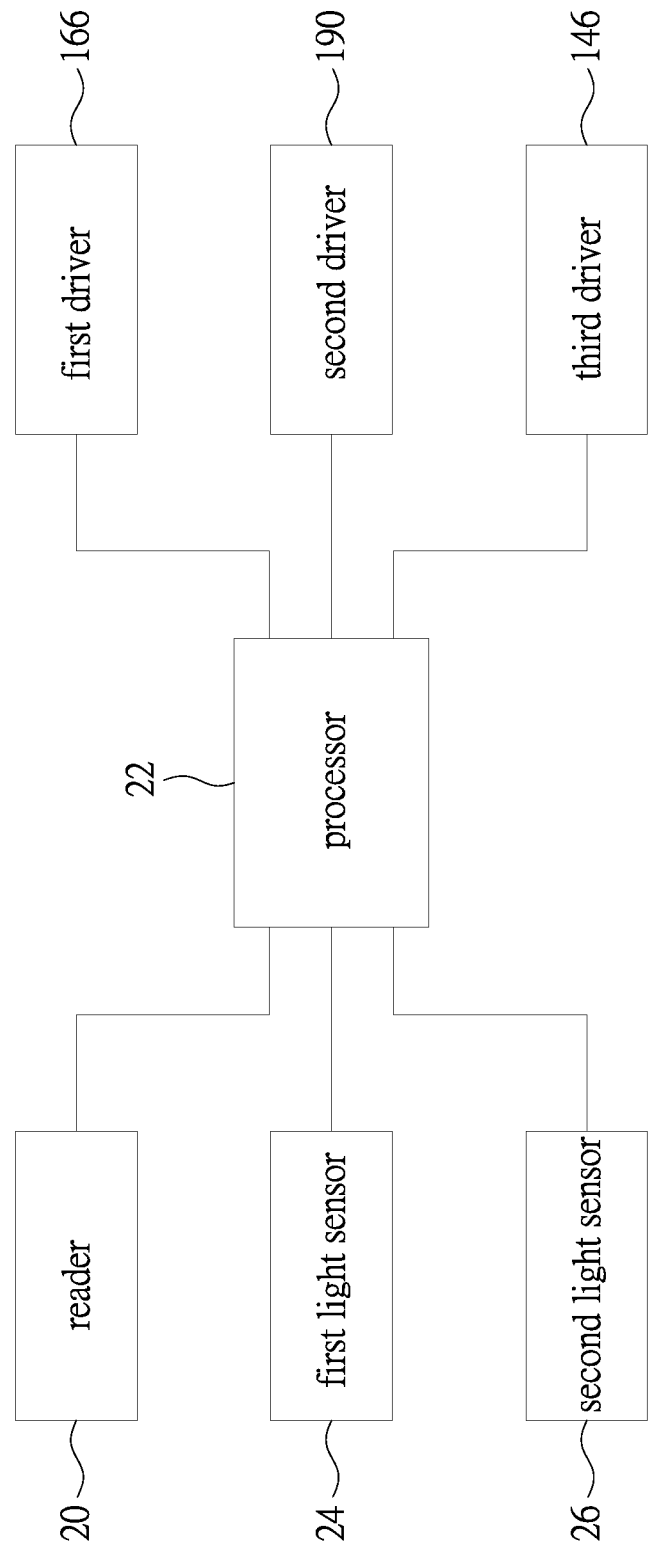
FIG. 4 is a circuit diagram of the keyboard testing machine according to an embodiment of the disclosure.

FIG. 4 is a circuit diagram of the keyboard testing machine 1 according to an embodiment of the disclosure.

As shown in FIG. 1 and FIG. 4, the keyboard testing machine 1 further includes a reader 20 and a processor 22. The reader 20 of the keyboard testing machine 1 is adjacent to the conveyer 4 and is used to read a barcode 32 on the electronic apparatus 3. The processor 22 of the keyboard testing machine 1 is electrically connected to the reader 20, the first driver 166 of the horizontally moving module 16, and the second driver 190 of the vertically moving module 18, and is used to drive the first driver 166 and the second driver 190 according to the barcode 32 on the electronic apparatus 3.

In an embodiment of the disclosure, the processor 22 of the keyboard testing machine 1 is disposed in an industrial computer (not shown), and the industrial computer includes a database (not shown) for recoding horizontal movement parameters and vertical movement parameters of different types of electronic apparatuses. Hence, when the reader 20 reads the barcode 32 on the electronic apparatus 3, the industrial computer recognizes the type of the electronic apparatus 3, and makes the processor 22 drive the first driver 166 and the second driver 190 respectively according to the horizontal movement parameters and the vertical movement parameters corresponding to the electronic apparatus 3, so as to accurately move the pressing module 14 over the keyboard 30 of the electronic apparatus 3 and thus perform testing processes.

Moreover, as shown in FIG. 1 and FIG. 4, the pressing module 14 of the keyboard testing machine 1 further includes a third driver 146 for driving the drive shaft 140. The keyboard testing machine 1 further includes a first light sensor 24 and a second light sensor 26. The first light sensor 24 and the second light sensor 26 are adjacent to the conveyer 4 and sequentially placed along a conveying direction A of the conveyer 4.

Therefore, when the conveyer 4 conveys the electronic apparatus 3 along the conveying direction A, the electronic apparatus 3 firstly passes by the first light sensor 24 of the keyboard testing machine 1, and then passes by the second light sensor 26. When the electronic apparatus 3 passes by the first light sensor 24, the first light sensor 24 generates a first blocking signal. When the electronic apparatus 3 passes by the second light sensor 26, the second light sensor 26 generates a second blocking signal. When the processor 22 receives the first blocking signal generated by the first light sensor 24, the processor 22 turns on the third driver 146, so as to drive the pressing module 14 to perform testing processes to the keyboard 30 of the electronic apparatus 3. When the processor 22 receives the second blocking signal generated by the second light sensor 26, the processor 22 turns off the third driver 146, so as to stop the pressing module 14 performing the testing processes.

Hence, the keyboard testing machine 1 of the disclosure is capable of driving the pressing assembly 144 to perform the testing processes to the keyboard 30 of the electronic apparatus 3 when the electronic apparatus 3 passes by the first light sensor 24, and stopping the pressing module 14 performing the testing processes to the electronic apparatus 3 when the electronic apparatus 3 passes by the second light sensor 26, so as to save energy.

According to the foregoing recitations of the embodiments of the disclosure, it can be seen that the pressing module included in the keyboard testing machine of the disclosure drives the pressing assembly to cyclically press the keyboard of the electronic apparatus, so as to save manpower. The keyboard testing machine of the disclosure is able to move the pressing module by using the horizontally moving module and the vertically moving module, and is able to use the reader to read the barcode on the electronic apparatus and thus recognize the type of the electronic apparatus, so as to accurately adjust the horizontal position and the vertical position of the pressing module relative to the keyboard by controlling the horizontally moving module and the vertically moving module according to the type of the electronic apparatus. Furthermore, the keyboard testing machine has light sensors to detect whether the electronic apparatus on the conveyer passes by, so as to start or stop the pressing module when the electronic apparatus passes by the light sensors and thus save energy.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A keyboard testing machine for testing a keyboard of an electronic apparatus being carried on a conveyer, the keyboard testing machine comprising:

a rack adjacent to the conveyer, wherein the rack has a first track located over the conveyer;

a fixing base operatively connected to the rack and located over the conveyer;

a pressing module located over the keyboard and comprising:

a drive shaft rotatably disposed on the fixing base;

a rotating member sleeved onto the drive shaft and having a cam portion; and a pressing assembly operatively connected to the fixing base and the cam portion;

a first sliding base operatively connected to the fixing base and slidably disposed on the first track, so as to drive the fixing base to move relative to the first track; and a vertically moving module disposed on the first sliding base and connected to the fixing base, so as to drive the fixing base to vertically move relative to the first sliding base, wherein when the drive shaft rotates together with the rotating member, the cam portion drives the pressing assembly to linearly move relative to the fixing base, so as to make the pressing assembly cyclically press the keyboard.

2. The keyboard testing machine of claim 1, further comprising a horizontally moving module, the horizontally moving module is operatively connected to the rack and the fixing base, so as to drive the fixing base to horizontally move relative to the first track by the first sliding base.

3. The keyboard testing machine of claim 2, wherein the rack further has a second track, the second track is parallel to the first track, and the horizontally moving module comprises:

a first screw rotatably disposed on the rack and parallel to the first track;

a second sliding base rotatably sleeved onto the first screw and slidably engaged with the second track;

a first belt sleeved onto the first screw; and a first driver fixed to the fixing base and the second sliding base, so as to drive the first screw to rotate by the first belt, wherein the rotated first screw drives the second sliding base to slide relative to the second track, and drives the first sliding base to slide relative to the first track through the first driver and the fixing base.

4. The keyboard testing machine of claim 3, further comprising:

a reader, adjacent to the conveyer, for reading a barcode on the electronic apparatus; and a processor electrically connected to the reader and the first driver, so as to drive the first driver according to the barcode.

5. The keyboard testing machine of claim 1, wherein the vertically moving module comprises:

a second screw rotatably disposed on the first sliding base and parallel to the sliding base;

a third sliding base rotatably sleeved onto the second screw and slidably engaged with the first sliding base;

a lifting board having an inclined plane for the third sliding base to abut against;

a first rod vertically passing through the first sliding base, wherein two ends of the first rod are respectively connected to the lifting board and the fixing base;

a second belt sleeved onto the second screw; and a second driver disposed on the first sliding base, so as to drive the second screw to rotate by the second belt, wherein the rotated second screw drives the third sliding base to move relative to the first sliding base to push the inclined plane, so as to drive the fixing base to vertically move relative to the first sliding base through the lifting board and the first rod.

6. The keyboard testing machine of claim 5, further comprising:

a reader, adjacent to the conveyer, for reading a barcode on the electronic apparatus; and a processor electrically connected to the reader and the second driver, so as to drive the second driver according to the barcode.

7. The keyboard testing machine of claim 1, wherein the fixing base comprises a supporting bracket, the cam portion has a circular groove located at the outer edge of the cam portion, and the pressing assembly comprises:

an engaging member slidably engaged with the circular groove;

a first guiding block fixed to the supporting bracket;

a second rod passing through the first guiding block, wherein an end of the second rod is connected to the engaging member;

a second guiding block connected to another end of the second rod;

a third rod passing through the second guiding block;

a stopper located between the first guiding block and the second guiding block and connected to an end of the third rod;

a pressing block connected to another end of the third rod, so as to press the keyboard; and a spring sleeved onto the third rod and compressed between the second guiding block and the pressing block.

8. The keyboard testing machine of claim 7, wherein the pressing block comprises a rubber wheel for pressing the keyboard.

9. The keyboard testing machine of claim 7, wherein the pressing module further comprises a third driver for driving the drive shaft to rotate, and the keyboard testing machine further comprises:

a first light sensor, adjacent to the conveyer, for generating a first blocking signal when the electronic apparatus passes by; and a processor electrically, connected to the first light sensor, for turning on the third driver according to the first blocking signal.

10. The keyboard testing machine of claim 9, further comprising a second light sensor, adjacent to the conveyer and electrically connected to the processor, for generating a second blocking signal when the electronic apparatus passes by, wherein the first light sensor and the second light sensor are sequentially placed along a conveying direction of the conveyer, and the processor turns off the third driver according to the second blocking signal.

\* \* \* \* \*